(12) United States Patent
Tuominen

(10) Patent No.: US 8,782,979 B2
(45) Date of Patent: Jul. 22, 2014

(54) METHOD AND ARRANGEMENT FOR ATTACHING A TOWER-LIKE STRUCTURE TO A FOUNDATION

(75) Inventor: Kari Tuominen, Lahti (FI)

(73) Assignee: Peikko Group Oy, Lahti (FI)

( * ) Notice: Subject to any disclaimer, the term of this patent is extended or adjusted under 35 U.S.C. 154(b) by 0 days.

(21) Appl. No.: 13/824,707

(22) PCT Filed: Sep. 15, 2011

(86) PCT No.: PCT/FI2011/050793
§ 371 (c)(1),
(2), (4) Date: Apr. 12, 2013

(87) PCT Pub. No.: WO2012/035206
PCT Pub. Date: Mar. 22, 2012

(65) Prior Publication Data
US 2013/0199117 A1    Aug. 8, 2013

(30) Foreign Application Priority Data
Sep. 16, 2010  (FI) .................................. 20105949

(51) Int. Cl.
*E02D 27/00*   (2006.01)
(52) U.S. Cl.
USPC .......................... 52/297; 52/296; 52/741.14
(58) Field of Classification Search
USPC ................ 52/169.13, 295, 296, 297, 741.14, 52/745.21
See application file for complete search history.

(56) References Cited

U.S. PATENT DOCUMENTS

| | | | | |
|---|---|---|---|---|
| 4,331,314 A * | 5/1982 | Chacour et al. | ............... | 248/679 |
| 5,548,939 A * | 8/1996 | Carmical | ........................ | 52/707 |
| 7,475,518 B2 * | 1/2009 | Suehiro | ..................... | 52/745.21 |
| 8,051,627 B2 * | 11/2011 | Schiffer et al. | ................ | 52/854 |
| 8,261,502 B2 * | 9/2012 | Andersen | ........................ | 52/297 |
| 8,307,593 B2 * | 11/2012 | Bagepalli | .................... | 52/223.5 |
| 8,443,557 B2 * | 5/2013 | Gevers et al. | .................. | 52/170 |
| 8,443,939 B2 * | 5/2013 | Astor | ............................ | 182/207 |
| 2008/0236075 A1 | 10/2008 | Andersen | | |
| 2008/0302038 A1 | 12/2008 | Wobben | | |
| 2011/0138706 A1 | 6/2011 | Voss et al. | | |

FOREIGN PATENT DOCUMENTS

| | | |
|---|---|---|
| DK | 2003 00203 U3 | 9/2003 |
| EP | 1 849 920 A2 | 10/2007 |
| EP | 2 149 703 A2 | 2/2010 |
| FR | 1.406.299 | 7/1965 |
| WO | WO 2008/003749 A1 | 1/2008 |
| WO | WO 2011/047723 A1 | 4/2011 |

OTHER PUBLICATIONS

Dec. 19, 2011 International Search Report issued in International Application No. PCT/FI2011/050793.

(Continued)

*Primary Examiner* — Jeanette E Chapman
*Assistant Examiner* — Daniel Kenny
(74) *Attorney, Agent, or Firm* — Oliff PLC

(57) ABSTRACT

The invention relates to method and arrangement for attaching a tower-like structure to a foundation. In the invention, a circular element is anchored to the concrete forming the foundation. The circular element is fitted on the surface of the foundation such that the circular element remains partially inside the concrete. The lowest part of the tower-like structure is attached by a screw connection to the circular element.

13 Claims, 2 Drawing Sheets

(56) References Cited

OTHER PUBLICATIONS

Figure 1:
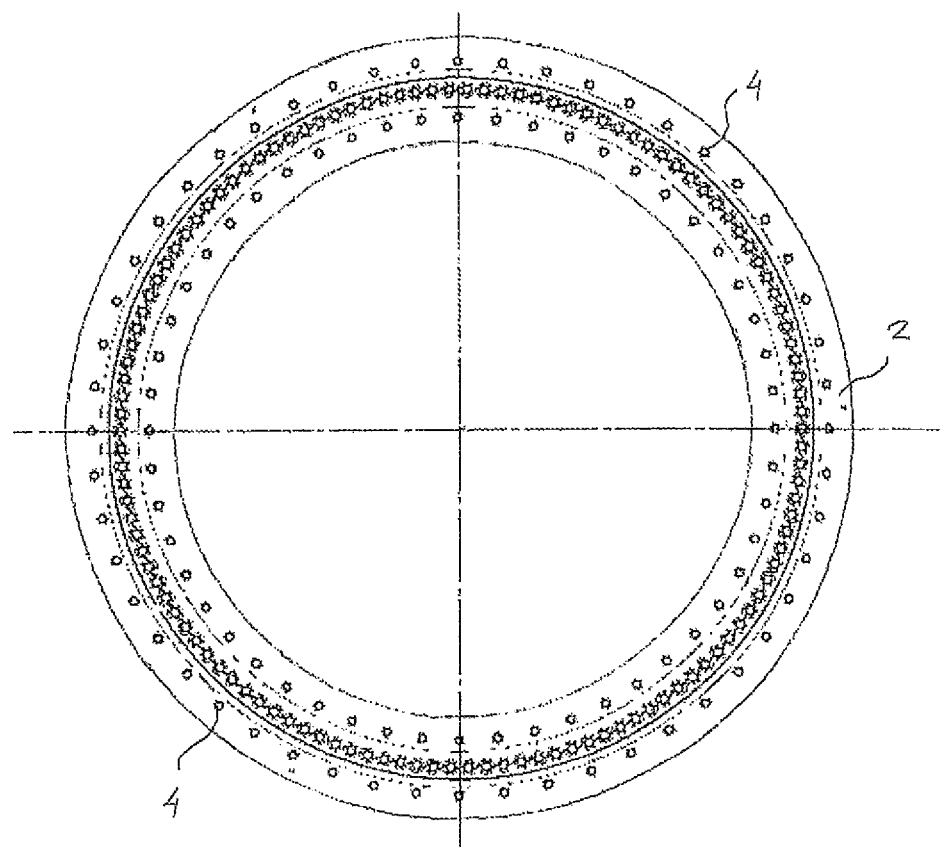

Dec. 19, 2011 Written Opinion of the International Searching Authority issued in International Application No. PCT/FI2011/050793.

Oct. 17, 2012 International Preliminary Report on Patentability issued in International Application No. PCT/FI2011/050793.
Jun. 21, 2011 Finnish Search Report issued in Finnish Application No. 20105949 (with translation).

* cited by examiner

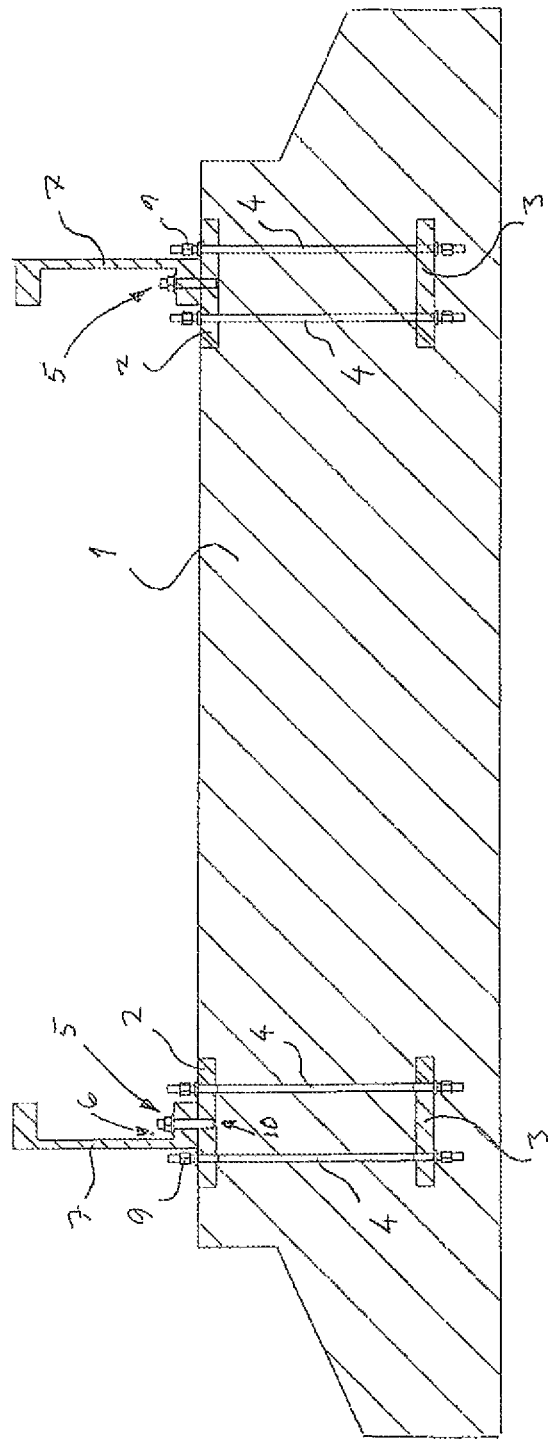
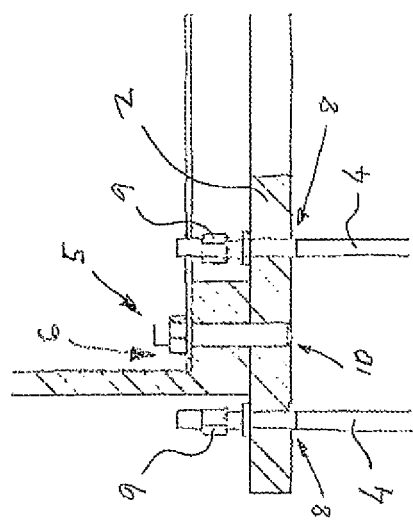

METHOD AND ARRANGEMENT FOR ATTACHING A TOWER-LIKE STRUCTURE TO A FOUNDATION

The invention relates to a method for attaching a tower-like structure to a foundation, in which method a circular element is anchored to the concrete forming the foundation. The invention also relates to an arrangement for attaching a tower-like structure to a foundation.

Currently, tower-like structures are used in connection with a large variety of structures. As examples of structures, in connection with which tower-like structures are used, mention can be made of wind power plants, antenna masts, different kinds of mast structures used in radio and telephone technology, different kinds of columns, for example, in connection with the structures of bridge and electric transfer, etc. Such tower-like structures are usually produced from metal, for example, from steel, and they are joined to a foundation produced from reinforced concrete.

A typical solution according to known art is to form a flange at the bottom end of a tower-like structure. The flange has normally through holes, into which anchoring bolts are fitted. At the heads of the anchoring bolts are fitted nuts, with which the flange and, along with it, the tower-like structure is attached to the anchoring bolts. The anchoring bolts are generally attached to a circular anchoring element, which is fitted inside the concrete. The concrete surface of the foundation is often rough, so on the surface in question is normally fitted a soldering surface, on top of which the flange is fitted.

However, the disadvantage of the arrangement described above is that the base of the tower-like structure must be fitted onto the solder layer before the final curing of the solders. After installing the base of the tower-like structure, it is necessary to wait a given period of time, which is dependent on curing of the solder, before the next elements of the tower-like structure can be installed. Curing of the solder typically takes about a day. However, it must be noted that, under some conditions, curing of the solder may require even a considerably greater time. While the solder is curing, the installation work of the tower-like structure cannot be continued.

The base of the tower-like structure, i.e. that part, which is against the foundation, is often relatively large and heavy. For example, the base of the tower of a wind power plant can be approx. 10-20 m long. Thus, the part in question is transported in the horizontal position and, typically, two cranes are required to lift the part into the vertical position and fit it onto the solder. The cranes used in the installation are typically mobile cranes, which as such are very expensive and their operating costs are also high. Nonetheless, there is no use for the cranes while the solder is curing, and because use of the cranes is expensive, it is not desirable to leave them standing idle. As a whole, the situation is difficult, as installation sites of tower-like structures, for example, installation sites of wind power plants, are very often far from other settled areas. Thus, transporting the cranes in the meantime to other work is also expensive. Thus, in practise, the cranes quite often stand idle for that time while the solder cures, even though the costs of the waiting period are quite high.

Relating to the basic principle briefly described above, in the field different types of additional solutions have been developed.

As an example of such additional applications of basic technique mention can be made of the solution described in EP 1 849 920 A2. In above said known solution is described a type of middle section or adapter, which is fitted between the foundation and the base of the tower-like structure. Above said adapter is a relatively small part, so it can be transported in the vertical position to the installation site and lifted onto the solder formed on the foundation using one small crane.

The advantage of the solution according to EP 1 849 920 A2 is that the installation stage is managed using one crane that is smaller than previously required, wherein the costs from operation time and downtime can be decreased in comparison to the corresponding costs created by two larger cranes.

However, the problem with the solution according to EP 1 849 920 A2 is that the adapter described is quite an expensive solution. The structure is a uniform forged or welded structure, wherein the production costs are significantly high. Additionally, it must be noted that, for example, welding a web on the surface of a T-flange is a great risk factor, especially in dynamically loaded joints. The problem with the flange is further that it widens the structure, which, in turn, complicates transportation. In this connection, it must be noted that the structures to be transported are already over-wide, wherein even a slight increase in the width of the structure may create serious practical problems, which can lead, for example, to the use of long detour routes during transportation. However, although the adapter can, in principle, be smaller than the base of the tower-like structure, the reality is that the adapter is also a quite heavy element. The weight of the adapter can easily rise to the range of 10-20 tons, so that moving the adapter, in any event, requires special arrangements, which will create costs. The factor presented above is due to the fact that the adapter is installed on the worksite in connection with foundation casting, wherein there is normally not adequately heavy lifting equipment on the worksite. Thus, for the purpose of handling the adapter, it becomes necessary, in any event, to bring to the worksite an adequately heavy-duty crane, which increases total worksite costs. The problem is that while installing the described adapter a separate installation frame is always required.

The object of the invention is to provide a solution, with which the disadvantages of prior known art are eliminated. This is achieved with a method and an arrangement according to the invention. A method according to the invention is characterized in that a circular element is fitted onto the surface of the foundation such that the circular element remains partially inside the concrete and that the lowest part of the tower-like structure is attached by a screw connection to the circular element. An arrangement according to the invention is, in turn, characterized in that a circular element is fitted to be placed partially inside the concrete of the foundation and that the circular element is provided with means for providing a screw connection between the lowest part of the tower-like structure and the circular element.

The advantage of the invention is that welding joints are not used at all, wherein the disadvantages of known art created by welding joints are eliminated. The advantage of the invention is further that the solution can be implemented from separate parts, wherein the parts can be delivered as a normal shipment. The weight of the parts to be lifted, in this case, forms as relatively small. The weights for the parts are in the range of 1-4 tons and for the whole 4-12 tons. An advantage is also that a solution according to the invention is attached with a joint formed by an ordinary P-flange. In addition, the advantage of the invention is that, in connection with installation, no installation frame is required, as the structure can also be used as an installation frame.

Figure 2:
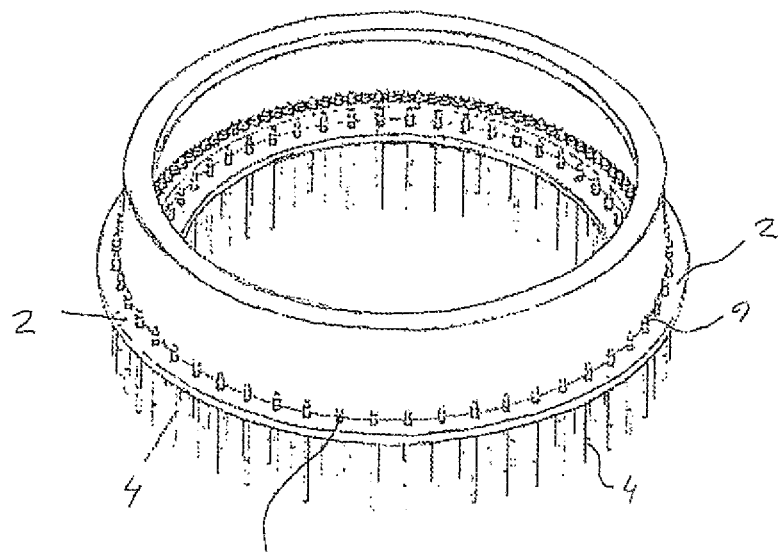

In the following, the invention is described in greater detail by means of an exemplary embodiment depicted in the accompanying drawings, wherein FIG. 1 shows an arrangement according to the invention viewed from above in cross-section, FIG. 2 shows an arrangement according to the invention as a perspective view, FIG. 3 shows an arrangement according to the invention as a principle cross-section viewed from the side when installed on the foundation and FIG. 4 shows a detail of FIG. 3 viewed on a larger scale.

FIGS. 1-4 show in principle an exemplary embodiment of an arrangement according to the invention.

In the figures, the foundation is marked by reference number 1. The foundation is formed from concrete having steel reinforcements. By reference number 2 is marked the circular element, which is anchored to the foundation 1. Anchoring can take place, for example, with anchoring bolts 4 and the circular anchoring element 3. The circular anchoring element 3 is placed in the foundation such that it remains inside the concrete.

The facts presented above are obvious to the person skilled in the art, so that the facts in question are not described in greater detail in this connection.

According to the essential idea of the invention, the circular element 2 is fitted on the surface of the foundation 1 such that the circular element 2 remains partially inside the concrete. The circular element 2 can be formed from one or several parts.

The lowest part 7 of the tower-like structure is attached by a screw connection 5 to the circular element. In the example of the figures, the circular element 2 is produced from a sheet-like material. The circular element 2 can, naturally, be produced also from another kind of material, for example, from a square-profile shaped material. It is essential that above the upper surface of the concrete is formed an even surface for attachment of the lowest part of the tower-like structure, as is shown in the figures. Above said facts are clearly visible in FIG. 3.

In the example of the figures, the lowest part 7 of the tower-like structure is attached to the circular element 2 by an interior flange connection (P-flange). The interior flange connection is shown by reference number 6.

In the example of the figures, the lowest part 7 of the tower-like structure is preferably a part having a circular-cylindrical shape. However, the invention is in no way limited to a circular-cylindrical shape, rather the shape of the lowest part 7 of the tower-like structure can vary in accordance with each respective need, i.e. the cross-section of the tower part of the tower-like structure to be built can also be other than round. The foundation 1 is, naturally, fitted to be supported by the soil.

In the figures is shown only the lowest part of the tower-like structure. The tower-like structure is formed in a normal manner by installing the parts of the tower-like structure on top of each other and attaching the parts together successively at their ends.

As stated above, the circular element is fitted on the surface of the foundation 1 such that the circular element remains partially inside the concrete of the foundation 1, wherein the upper surface of the circular element 2 remains slightly above the upper surface of the concrete. Above said fact is clearly visible in FIG. 3. The upper surface of the circular element 2 remains visible on the upper surface of the concrete, wherein the lowest part 7 of the tower-like structure can be attached to it. The circular element 2 is arranged partially inside the concrete of the foundation such that the circular element 2 is anchored to the foundation with anchoring bolts 4. The anchoring bolts 4 come through the circular element 2 and are tightened with nuts on the upper surface of the circular element 2 or in its vicinity. Thus, at the upper end of the anchoring bolts 4, there is a circular element 2, through which the anchoring bolts 4 go and above which circular element 2 the anchoring bolts 4 are attached with nuts or other corresponding attachment organs. At the bottom end of the anchoring bolts 4, there is preferably a circular anchoring element 3, which is preferably completely within the foundation. Thus, the circular element 2 can be anchored to the foundation with the anchoring bolts 4.

Thus, the arrangement according to the invention is installed in place during the stage of reinforcing the foundation, wherein, after casting the concrete, the circular element 2 is on the surface of the concrete partially inside the concrete, as is shown in FIG. 3.

Due to the screw connection, the parts of the arrangement can be transported to the installation site as separate parts, wherein transportation is significantly easier than using prior known art. A solution according to the invention is also cost-effective and technically inexpensive, as the expensive structures produced by forging, used in prior known art, are not used and the problems of welding joints are also eliminated.

The holes 8 in the circular element 2 for the anchoring bolts 4 are through holes. The holes 8 are visible in FIG. 4. Tightening of the anchoring bolts takes place by turning the nuts on the ends of the anchoring rods. The nuts 9 are visible in FIG. 4. The holes 10 of the screw connection 5 in the circular element 2 are, in turn, threaded holes.

An arrangement according to the invention, more specifically stated, the circular element 2 can also be used as an installation frame. The element in question is cast in the concrete, as presented above.

If above said circular element is, after casting, at the correct position and height, then nothing need be done to the structure, rather the installation work of the tower-like structure may continue.

If above said circular element is, in turn, at the wrong height, for example, skewed and/or at the wrong height, then, in that case, the screws are turned the required amount into the inner screw holes 10 of the screw connection. The screws are turned through the circular element 2 such that they press against the surface of the concrete. In this case, the circular element 2 begins to rise under the influence of the force created by the screws and rises to the correct position and/or height. Next, the gap created between the concrete and the circular element 2 is soldered shut. After the solder has cured, the structure transfers the compression directly from the circular element 2 to the concrete.

The lowest part 7 of the tower-like structure is tightened directly against the circular element 2 with the screws of the screw connection 5. In this case, the force transfers as compression directly from the tower-like structure to the circular element 2 and further to the concrete of the foundation 1. In a tensile situation, force is transferred through the screws of the screw connection 5 from the P-flange further to the circular element 2. The circular element is anchored to the concrete of the foundation with anchoring bolts, as is disclosed above.

The embodiment of the invention presented above is not intended to limit the invention in any way, rather the invention may be freely modified within the claims. The invention is, for example, not limited in any way to the forms and dimensions/proportions shown in the figures, rather the forms and dimensions/proportions of the different parts can vary according to each respective situation, etc.

The invention claimed is:

1. An attaching method for attaching a tower-like structure to a foundation formed of concrete, a ring-shaped element being anchored to the concrete forming the foundation, the method comprising the steps of:

fitting the ring-shaped element on a surface of the concrete of the foundation such that the ring-shaped element remains partially inside the concrete and such that an upper surface of the ring-shaped element remains above the surface of the concrete of the foundation and such that the ring-shaped element is anchored to the foundation with anchoring bolts; and attaching a lowest part of the tower-like structure by a screw connection to the ring-shaped element.

2. The attaching method according to claim 1, further comprising forming the ring-shaped element from several parts.

3. The attaching method according to claim 1, further comprising attaching the lowest part of the tower-like structure to the ring-shaped element by an internal flange connection.

4. The attaching method according to claim 1, further comprising:

placing the ring-shaped element to a correct position by turning screws of the screw connection in threaded holes of the ring-shaped element;

tightening the screws of the screw connection against the surface of the concrete of the foundation to lift the ring-shaped element from the surface of the concrete of the foundation into the correct position; and soldering the gap between the concrete of the foundation and the ring-shaped element shut when the ring-shaped element is in the correct position.

5. An attaching arrangement for attaching a tower-like structure to a foundation formed of concrete, the attaching arrangement comprising a ring-shaped element, which is anchored to the concrete forming the foundation, wherein:

the ring-shaped element is located partially inside the concrete of the foundation such that an upper surface of the ring-shaped element remains above a surface of the concrete of the foundation and such that the ring-shaped element is anchored to the foundation with anchoring bolts, and the ring-shaped element is provided with screw connection means for providing a screw connection between a lowest part of the tower-like structure and the ring-shaped element.

6. The attaching arrangement according to claim 5, wherein ring-shaped element is formed from several parts.

7. The attaching arrangement according to claim 5, wherein:

the lowest part of the tower-like structure comprises an inner flange, and the screw connection means for providing a screw connection are formed in the inner flange of the lowest part of the tower-like structure.

8. The attaching arrangement according to claim 5, wherein the screw connection means for providing a screw connection comprise threaded holes.

9. The attaching arrangement according to claim 8, wherein:

the threaded holes are formed in the ring-shaped element for the screw connection, and the ring-shaped element can be moved into the correct position by turning screws in the threaded holes and tightening the screws against the surface of the concrete.

10. The attaching method according to claim 2, further comprising:

placing the ring-shaped element to the correct position by turning the screws in the threaded holes of the ring-shaped element;

tightening the screws against the concrete surface to lift the ring-shaped element from the surface of the concrete into the correct position; and soldering the gap between the concrete and the ring-shaped element shut when the ring-shaped element is in the correct position.

11. The attaching method according to claim 3, further comprising:

placing the ring-shaped element to the correct position by turning the screws in the threaded holes of the ring-shaped element;

tightening the screws against the concrete surface to lift the ring-shaped element from the surface of the concrete into the correct position; and soldering the gap between the concrete and the ring-shaped element shut when the ring-shaped element is in the correct position.

12. The attaching method according to claim 1, further comprising forming the ring-shaped element from one part.

13. The attaching arrangement according to claim 5, wherein the ring-shaped element is formed from one part.

* * * * *